United States Patent
Eck et al.

(10) Patent No.: US 6,197,863 B1
(45) Date of Patent: Mar. 6, 2001

(54) CROSSLINKABLE POWDER COMPOSITION WHICH IS REDISPERSIBLE IN WATER

(75) Inventors: Herbert Eck, Bad Toelz; Reiner Figge, Ampfing; Herbert Barthel, Emmerting, all of (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/501,723

(22) Filed: Feb. 10, 2000

Related U.S. Application Data

(63) Continuation of application No. 09/126,455, filed on Jul. 3, 1998, now abandoned.

(30) Foreign Application Priority Data

Jul. 31, 1997 (DE) ............................................. 197 33 157

(51) Int. Cl.$^7$ ...................................................... C08K 3/18
(52) U.S. Cl. ........................................... 524/430; 524/502
(58) Field of Search ...................................... 524/430, 502

(56) References Cited

U.S. PATENT DOCUMENTS 5,813,452 * 9/1998 Haruta ................................... 165/133

* cited by examiner

*Primary Examiner*—Paul R. Michl
(74) *Attorney, Agent, or Firm*—Milton J. Wayne; William R. Moran; Burgess, Ryan & Wayne

(57) ABSTRACT

Crosslinkable powder compositions are provided which are redispersible in water and comprise a) from 30 to 95 parts by weight of one or more water-insoluble, film-forming polymers of one or more free-radically polymerizable, ethylenically unsaturated monomers, b) from 5 to 70 parts by weight of one or more water-soluble polymers, where at least one of the polymer components a) and b) comprises one or more comonomer units containing crosslinkable groups, and the parts by weight of a) and b) add up to 100 parts by weight, and c) from 0.5 to 30% by weight, based on the total weight of a) and b), of inorganic or organic solids which are insoluble in water and in organic solvents and have a mean particle size of from 5 nm to 100 $\mu$m, which solids have, chemically bound to their surface, functional groups capable of forming covalent bonds with the crosslinkable groups of the polymers a) and b).

11 Claims, No Drawings

CROSSLINKABLE POWDER COMPOSITION WHICH IS REDISPERSIBLE IN WATER

This application is a continuation of U.S. application Ser. No. 09/126,455, filed Jul. 3, 1998, now abandoned, the entire contents of which are incorporated herein by reference.

BACKGROUND OF THE INVENTION

1) Field of the Invention

The invention relates to a crosslinkable powder composition which is redispersible in water and also to its use.

2) Background Art

EP-A 601518 describes crosslinkable dispersion powders which are redispersible in water and based on carboxyl-containing acrylate copolymers which are dried in the presence of polyvinyl alcohol and can contain polyvalent metal ions for crosslinking. Similar crosslinkable dispersion powders are also known from U.S. Pat. No. 3,409,578 in which powder compositions comprising carboxyl-containing polymers and/or carboxyl-containing protective colloids are crosslinked in the presence of polyvalent metal ions. A disadvantage is that such compositions comprising polyvalent metal salts which liberate acid in the presence of water tend to crosslink prematurely, especially in contact with moisture.

To avoid premature crosslinking, EP-A 702059 (U.S. Pat. No. 5,608,011) proposes using crosslinkable dispersion powders comprising N-methylol-containing copolymers and a catalyst combination of water-soluble or water-dispersible peroxo acid salts or reducing agents. EP-B 687317 describes crosslinkable powders which are redispersible in water and are based on N-methylol-functional copolymers which crosslink on heating. A disadvantage of the latter powder is the fact that exclusively heat-crosslinkable powders cannot be used in many applications.

EP-A 723975 discloses crosslinkable dispersion powders based on copolymers containing epoxide groups. For crosslinking, external crosslinkers such as polyamines, polycarboxylic acids, hydroxy-functionalized polymers and polyvalent metal salts are added. A problem with the use of polyamines or polyvalent metal salts is the low storage stability.

EP-A 721004 discloses crosslinkable, redispersible powder mixtures comprising film-forming polymer particles having at least one functional, crosslinkable group. The crosslinker component can be a water-soluble or emulsifiable monomer or polymer, or else a pulverulent mixture of the crosslinker and an inorganic carrier such as $CaCO_3$, clay or silicon dioxide. The crosslinker component is bound to these carrier substances by physical adsorption. This has the disadvantage that these mixtures have the same odor, if somewhat attenuated, as the pure crosslinker component. In addition, owing to the weak physical bonding, the crosslinker component can become detached and penetrate into the polymer to be crosslinked, which, particularly in the case of very reactive substances, can lead to a reduced shelf life or premature crosslinking.

It is therefore an object of the invention to provide a crosslinkable powder composition which is redispersible in water and has a high storage stability and blocking stability and is free-flowing.

SUMMARY OF THE INVENTION

The invention provides a crosslinkable powder composition which is redispersible in water and comprises a) from 30 to 95 parts by weight of one or more water-insoluble, film-forming polymers of one or more free-radically polymerizable, ethylenically unsaturated monomers,
b) from 5 to 70 parts by weight of one or more water-soluble polymers,
where at least one of the polymer components a) and b) comprises one or more comonomer units containing crosslinkable groups, and the parts by weight of a) and b) add up to 100 parts by weight, and
c) from 0.5 to 30% by weight, based on the total weight of a) and b), of inorganic or organic solids which are insoluble in water and in organic solvents and have a mean particle size of from 5 nm to 100 μm, which solids have, chemically bound to their surface, functional groups capable of forming covalent bonds with the crosslinkable groups of the polymers a) and b).

DESCRIPTION OF THE PREFERRED EMBODIMENT

Suitable water-insoluble, film-forming polymers comprise one or more monomer units selected from the group consisting of vinyl esters of unbranched or branched alkylcarboxylic acids having from 1 to 15 carbon atoms, methacrylic and acrylic esters of unbranched or branched alcohols having from 1 to 12 carbon atoms, fumaric and maleic monoesters or diesters of unbranched or branched alcohols having from 1 to 12 carbon atoms, dienes such as butadiene or isoprene, olefins such as ethene or propene, vinylaromatics such as styrene, methylstyrene or vinyltoluene, and vinyl halides such as vinyl chloride. For the purposes of the present invention, water-insoluble means that the solubility of the polymers under normal conditions is less than 1 g per liter of water. For film formation, the polymer composition is generally selected such that film formation occurs at the processing temperature, preferably such that a glass transition temperature Tg of from −30° C. to +80° C. results.

Preferred vinyl esters are vinyl acetate, vinyl propionate, vinyl butyrate, vinyl 2-ethylhexanoate, vinyl laurate, 1-methylvinyl acetate, vinylpivalate and vinyl esters of alpha-branched monocarboxylic acids having from 5 to 11 carbon atoms, for example VeoVa09® of VeoVa10® (trade names of Shell). Particular preference is given to vinyl acetate.

Preferred methacrylic or acrylic esters are methyl acrylate, methyl methacrylate, ethyl acrylate, ethyl methacrylate, propyl acrylate, propyl methacrylate, n-butyl acrylate, t-butyl acrylate, n-butyl methacrylate, t-butyl methacrylate, 2-ethylhexyl acrylate. Particular preference is given to methyl acrylate, methyl methacrylate, n-butyl acrylate and 2-ethylhexyl acrylate.

Preferred ester groups in the esters of fumaric and maleic acids are methyl, ethyl, n-propyl, iso-propyl, n-butyl, iso-butyl, t-butyl, hexyl, ethylhexyl and dodecyl groups.

Suitable comonomers having crosslinkable groups are generally those containing functional groups which crosslink via nucleophilic substitution reactions, condensation reactions or addition reactions. The crosslinkable groups are preferably incorporated by copolymerization of monomers containing the desired functional groups. However, appropriately substituted comonomer units can also be functionalized subsequently.

Monomers suitable for crosslinking via condensation reactions are alkoxysilane-functional monomer units such as acryloxypropyltri(alkoxy)silanes and methacryloxypropyltri(alkoxy)silanes, vinyltrialkoxysilanes and vinylmethyldialkoxysilanes; alkoxy groups which may be present are, for example, methoxy, ethoxy, methoxyethylene, ethoxyethylene, methoxypropylene glycol ether and ethoxypropylene glycol ether radicals. Preference is given to vinyltriethoxysilane and gammamethacryloxypropyltriethoxysilane.

Further examples of comonomers which can be crosslinked by a condensation reaction are acrylamidoglycolic acid (AGA), methyl methacrylamidoglycolate (MMAG), N-methylolacrylamide (NMAA), N-methylolmethacrylamide, N-methylolallyl carbamate, alkyl ethers of N-methylolacrylamide or N-methylolmethacrylamide, e.g. their isobutoxy ethers or n-butoxy ethers.

Comonomers which can be crosslinked by means of addition reactions are comonomers containing epoxide groups, for example glycidyl acrylate, glycidyl methacrylate, glycidyl vinyl ether and glycidyl allyl ether, and isocyanate monomers such as meta- and para-isopropenyl-alpha,alpha-dimethylbenzyl isocyanate (TMI), 2-methyl-2-isocyanatopropyl methacrylate; the isocyanate groups of the monomers mentioned may also, if desired, be blocked, for example by means of phenol, salicylic esters, ketoxime, caprolactam, dialkyl malonates, alkyl acetoacetates, 2,2-dimethyl-1,3-dioxane-4,6-dione.

Further examples of crosslinkable comonomers are hydroxyl-containing comonomers such as hydroxyalkyl acrylates and methacrylates which may, if desired, be acetoacetylated, e.g. hydroxyethyl (meth)acrylate, hydroxypropyl (meth)acrylate and hydroxybutyl (meth)acrylate. Also suitable are carboxyl- or sulfo-functional comonomers such as vinylsulfonic acid, acrylic, methacrylic, maleic, fumaric, crotonic and itaconic acids, the monoesters of maleic and fumaric acids, monovinyl succinate and methylenemalonic acid. Examples of crosslinkable comonomers containing anhydride groups are allylsuccinic anhydride and maleic anhydride.

Examples of crosslinkable monomers units containing carbonyl groups are vinyl or allyl acetoacetate, vinyl or allyl bisacetoacetate and acrolein. Examples of crosslinkable monomer units containing amine groups are allylamine, 2-aminoethyl (meth)acrylate, compounds containing hydrazide groups, e.g. the hydrazides of acrylic acid and crotonic acid. Also suitable are compounds containing reactive halogen atoms, e.g. vinyl or allyl chloroacetate, chloromethylstyrene, allyl chloride or allyl bromide, vinylidene chloride.

Preferred crosslinkable monomer units are glycidyl (meth)acrylate, meta- and para-isopropenyl-alpha,alpha-dimethylbenzyl isocyanate (TMI), allyl acetoacetate, unmodified or acetoacetylated hydroxyethyl (meth)acrylate or hydroxypropyl (meth)acrylate, acrylamidoglycolic acid (AGA), methyl methacrylamidoglycolate (MMAG), N-methylolacrylamide (NMAA), acrylic, methacrylic, maleic, fumaric, crotonic and itaconic acids.

The crosslinkable monomer units are generally present in an amount of from 0.1 to 10% by weight, preferably from 0.5 to 5% by weight, in each case based on the total weight of the polymer a).

Other suitable auxiliary monomers are multiply ethylenically unsaturated comonomers such as ethylene glycol diacrylate, 1,3-butylene glycol diacrylate, 1,4-butylene glycol diacrylate, propylene glycol diacrylate, divinyl adipate, divinylbenzene, vinyl methacrylate, vinyl acrylate, allyl methacrylate, allyl acrylate, diallyl maleate, diallyl phthalate, diallyl fumarate, methylenebisacrylamide, cyclopentadienyl acrylate or triallyl cyanurate.

As polymers a) which comprise the crosslinkable comonomer units mentioned in the amounts indicated, preference is given to:

from the group consisting of vinyl ester polymers vinyl acetate polymers;

vinyl ester-ethylene copolymers such as vinyl acetate-ethylene copolymers having an ethylene content of from 1 to 60% by weight;

vinyl ester-ethylene-vinyl chloride copolymers having an ethylene content of from 1 to 40% by weight and a vinyl chloride content of from 20 to 90% by weight in which vinyl esters present are preferably vinyl acetate and/or vinyl propionate and/or one or more copolymerizable vinyl esters such as vinyl laurate, vinyl pivalate, vinyl 2-ethylhexanoate, vinyl esters of alpha-branched carboxylic acids, in particular the vinyl ester of versatic acid;

vinyl acetate copolymers with from 1 to 50% by weight of one or more copolymerizable vinyl esters such as vinyl laurate, vinyl pivalate, vinyl 2-ethylhexanoate, vinyl esters of alpha-branched carboxylic acids, in particular vinyl esters of versatic acid (VeoVa9®, VeoVa10®), which may further comprise from 1 to 40% by weight of ethylene;

vinyl ester-acrylic ester copolymers comprising from 30 to 90% by weight of vinyl ester, in particular vinyl acetate, and from 1 to 60% by weight of acrylic ester, in particular n-butyl acrylate or 2-ethylhexyl acrylate, which may further comprise from 1 to 40% by weight of ethylene;

vinyl ester-acrylic ester copolymers comprising from 30 to 75% by weight of vinyl acetate, from 1 to 30% by weight of vinyl laurate or a vinyl ester of an alpha-branched carboxylic acid, in particular the vinyl ester of versatic acid, from 1 to 30% by weight of acrylic ester, in particular n-butyl acrylate or 2-ethylhexyl acrylate, which may further comprise from 1 to 40% by weight of ethylene;

vinyl ester copolymers with esters of maleic acid or fumaric acid, e.g. the diisopropyl, di-n-butyl, di-t-butyl, di(ethylhexyl) and methyl t-butyl esters, for example vinyl acetate copolymers with from 10 to 60% by weight of one or more of the maleic/fumaric esters mentioned, which may further comprise ethylene or further copolymerizable vinyl esters such as vinyl laurate or the vinyl ester of versatic acid.

From the group consisting of (meth)acrylic polymers polymers of n-butyl acrylate or 2-ethylhexyl acrylate; copolymers of methyl methacrylate with n-butyl acrylate and/or 2-ethylhexyl acrylate.

From the group consisting of vinyl chloride polymers, apart from the abovementioned vinyl ester-ethylene-vinyl chloride copolymers, vinyl chloride-ethylene copolymers and vinyl chloride-acrylate copolymers.

From the group consisting of styrene polymers styrene-butadiene copolymers and styrene-acrylic ester copolymers such as styrene-n-butyl acrylate or styrene-2-ethylhexyl acrylate, each having a styrene content of from 1 to 70% by weight.

Water-soluble polymers b) used are water-soluble protective colloids which may, if desired, be functionalized by hydroxyl groups, mercapto groups, carboxyl groups, amine groups or carbonyl groups. For the purposes of the present invention, water-soluble means that the solubility under normal conditions is more than 10 g per liter of water. Suitable protective colloids are commercially available. If the functional groups are not already present in the protective colloids, the latter can also be functionalized subsequently. Polyvinyl alcohols functionalized by mercapto groups, carboxyl groups, amine groups or carbonyl groups are also obtainable by copolymerization of correspondingly functionalized comonomers with vinyl acetate and subsequent hydrolysis in a manner known to those skilled in the art.

Examples of suitable protective colloids are polyvinyl alcohols comprising from 75 to 100 mol %, preferably from 78 to 95 mol %, of vinyl alcohol units and having a molecular weight of preferably from 5000 to 200000; polyvinylpyrrolidones having a K value of from 10 to 120; polysaccharides in water-soluble form, e.g. starches (amylose and amylopectin), celluloses and their carboxymethyl, methyl, hydroxyethyl and hydroxypropyl derivatives; proteins such as casein, soya protein and gelatin; lignosulfonates; synthetic polymers such as poly(meth)acrylic acid, poly(meth)acrylamide, polyvinylsulfonic acids and their water-soluble copolymers; melamine-formaldehyde sulfonates, naphthalene-formaldehyde sulfonates, styrene-maleic acid and vinyl ether-maleic acid copolymers.

As polymers b), preference is given to the abovementioned polyvinyl alcohols, starches, celluloses, casein, melamine-formaldehyde sulfonates, naphthalene-formaldehyde sulfonates and, from the group consisting of functionalized protective colloids, polyvinyl alcohols functionalized by carboxyl groups, acetoacetyl groups or amine groups and carboxymethyl-substituted starches and celluloses.

The water-soluble polymers b) mentioned can be added as protective colloids during the polymerization of the polymer a) or added as a spraying aid before spraying of the aqueous dispersion of the polymer a), or partly during the polymerization and the remainder before spraying.

Examples of functionalized, inorganic solids which are insoluble in water and organic solvents are functionalized, finely divided oxides of boron, aluminium, iron, cobalt, chromium, manganese, silicon, germanium, tin, titanium and zirconium. Also suitable are their mixed oxides such as aluminium silicates, for example sheet silicates such as clays, montmorillonite. Examples of functionalized, organic solvents which are insoluble in water and organic solvents are functionalized, unhydrolyzed starch and cellulose powders, organic pigments, carbon black, silicone resins and pulverulent, highly crosslinked polymers. The mean particle size is generally from 5 nm to 100 $\mu$m, preferably up to 10 $\mu$m.

Preference is given to silicon dioxides such as silica gels or silicas, clays, titanium dioxide, silicone resins and organic pigments. Particular preference is given to silicas, for example silicas prepared by wet chemical precipitation and in particular pyrogenic silica prepared by flame hydrolysis, for example of tetrachlorosilane or methyltrichlorosilane or methyldichlorosilane. The silicas which are preferably used have a hydrodynamic diameter of the silica aggregates of less than 10 $\mu$m, preferably less than 1 $\mu$m, in particular in the size range from 100 to 1000 nm. Preference is given to using those having a specific surface area of greater than 0.1 $m^2/g$, particularly preferably from 20 $m^2/g$ to 400 $m^2/g$ (measured by the BET method in accordance with DIN 66131 and 66132). Hydrophilic and hydrophobic silicas can be used.

The functional groups which are chemically bound to the surface of the solid particles are ones which react with the crosslinkable groups of the polymer a) or b), for example halogen, hydroxy, thiol, amino, epoxy, carboxyl, carboxylic anhydride, carbonyl, hydrazide or aziridine groups, reactive methylene groups, groups having polymerizable carbon double bonds, free-radical-forming groups such as hydroperoxide groups and also isocyanate groups which may, if desired, be blocked.

If the solid particles do not naturally contain the desired functional groups, the solids are functionalized using, for preference, monomeric, oligomeric or polymeric organosilicon compounds comprising units of the structure $R_aR^1SiX_b$ in which a=0, 1 or 2, b=1, 2 or 3 and a+b=3, where R are identical or different and are each a saturated or unsaturated, aliphatic or aromatic hydrocarbon radical having from 1 to 18 carbon atoms, X is a reactive radical for bonding to the solid particles and is selected from the group consisting of halogen, —$NH_2$, —OH or alkoxy, and $R^1$ is a functional alkyl or aryl radical which can react with crosslinkable groups. Oligomers or polymers comprising units of the abovementioned formula are obtained by condensation via the radicals X.

Examples of R are alkyl radicals such as the methyl radical, the ethyl radical, propyl radicals such as the iso- or n-propyl radical, butyl radicals such as the t- or n-butyl radical, pentyl radicals such as the neo-, iso- or n-pentyl radical, hexyl radicals such as the n-hexyl radical, octyl radicals such as the 2-ethylhexyl or n-octyl radical, decyl radicals such as the n-decyl radical, dodecyl radicals such as the n-dodecyl radical, hexadecyl radicals such as the n-hexadecyl radical and octadecyl radicals such as the n-octadecyl radical. Further examples are alkenyl radicals such as vinyl, 2-allyl and 5-hexenyl radicals; or aryl radicals such as the phenyl, biphenyl or naphthenyl radical; or alkylaryl radicals such as benzyl, ethylphenyl, tolyl and xylyl radicals. For reasons of availability, the preferred radical R is the methyl radical.

Bonding to the solid particles occurs via the radical X, a reactive radical selected from the group consisting of halogen, —$NH_2$, —OH and alkoxy, preferably—Cl or an alkoxy group having from 1 to 8 carbon atoms, e.g. methoxy, ethoxy, propoxy or butoxy. Particular preference is given to the methoxy and ethoxy groups.

Examples of the radical $R^1$ which reacts with the crosslinkable groups in the polymer a) or b) are preferably $C_1$–$C_4$-radicals containing functional groups which react with the crosslinkable groups, for example halogen, hydroxy, thiol, amino, epoxy, carboxyl, carboxylic anhydride, carbonyl, hydrazide and aziridine groups, reactive methylene groups, groups having polymerizable carbon double bonds and free-radical-forming groups such as hydroperoxides, and also isocyanate groups which may, if desired, be blocked. Preferred examples of $R^1$ are the propylsuccinic anhydride, methacryloxypropyl, glycidoxypropyl, aminoethylaminopropyl, 3-aminopropyl, 3-hydroxypropyl and 3-chloropropyl radicals.

Preferred examples of silylating agents of the formula $R_aR^1SiX_b$ are 3-triethoxysilylpropylsuccinic anhydride, methacryloxypropyltrimethoxysilane, glycidoxypropyltriethoxysilane and aminoethylaminopropyltrimethoxysilane.

The functionalization of the solid particles by means of silylation can be carried out in a manner known per se in water and/or organic solvents in the presence of bases. Examples of suitable solvents are aliphatic alcohols such as methanol, ethanol, n-propanol, iso-propanol, n- or iso-butanol and alcohol/water mixtures comprising the alcohols mentioned, and also ethers such as diethyl ether or tetrahydrofuran, ketones such as methyl isobutyl ketone and hydrocarbons such as n-hexane, cyclohexane, toluene or petroleum spirit. Suitable bases are inorganic bases such as ammonia, alkali metal hydroxides or alkaline earth metal hydroxides, alkali metal carbonates or alkaline earth metal carbonates, and organic bases such as alkylamine, for example methylamine, ethylamine or iso-octylamine, and arylamines such as pyridine. Preference is given to ammonia.

Usual mixing ratios are from 0.5 to 100 parts by weight of silylating agent per 100 parts by weight of solid particles. From 0.1 to 100 parts of water or solvent can be added. The reaction of the solid with the liquid reagents or their solution is carried out by intensive mixing. This can be carried out in a forced mixer, for example of the Lödige or Henschel type, or by fluidizing the silica by mechanical stirring or in a stream of inert gas and adding the liquids dropwise or spraying them in. The reaction time is preferably from 5 to 60 minutes. The reaction temperatures are, for reasons of the stability of the organic function, generally less than 160° C. After the silylation reaction is complete, the functionalized solid particles are dried.

Organic solid particles such as organic pigments or carbon black can, if they do not naturally contain the desired functional groups, also be functionalized using the methods customary in inorganic and organic chemistry, for example by substitution, addition and condensation reactions. Highly crosslinked polymers can also be functionalized by means of copolymerization of functional comonomers.

The water-insoluble polymers a) are preferably prepared using the emulsion polymerization process. This is carried out in an open reaction vessel or in pressure vessels in a temperature range from 0° C. to 100° C. and is initiated using the methods customarily employed for emulsion polymerization. Initiation is carried out by means of the customary, at least partially water-soluble free-radical formers which are preferably used in amounts of from 0.01 to 3.0% by weight, based on the total weight of the monomers. Examples are sodium persulfate, hydrogen peroxide, t-butyl peroxide, t-butyl hydroperoxide; potassium peroxodiphosphate, azobisisobutyronitrile. If desired, the free-radical initiators mentioned can also be combined in a known manner with from 0.01 to 0.5% by weight of reducing agents, based on the total weight of the monomers. Suitable reducing agents are, for example, alkali metal formaldehydesulfoxylates and ascorbic acid. In the redox initiation, one or both redox catalyst components are preferably metered in during the polymerization.

As dispersants, it is possible to use all emulsifiers customarily employed in emulsion polymerization. Suitable emulsifiers include anionic, cationic and also non-ionic emulsifiers. The emulsifiers are preferably used in an amount of up to 6% by weight, based on the total weight of the monomers. Examples of suitable emulsifiers are anionic surfactants such as alkyl sulfates having a chain length of from 8 to 18 carbon atoms, alkyl ether sulfates and alkylaryl ether sulfates having from 8 to 18 carbon atoms in the hydrophobic radical and up to 40 ethylene oxide or propylene oxide units, alkylsulfonates or alkylarylsulfonates having from 8 to 18 carbon atoms, diesters and monoesters of sulfosuccinic acid with monohydric alcohols or alkylphenols. Suitable non-ionic surfactants are, for example, alkyl polyglycol ethers or alkylaryl polyglycol ethers having from 8 to 40 ethylene oxide units.

The preparation is preferably carried out in the presence of the abovementioned protective colloids. The pH range desired for the polymerization, which is generally from 2.5 to 10, preferably from 3 to 8, can be set in a known manner by means of acids, bases and customary buffer salts such as alkali metal phosphates or alkali metal carbonates. To set the molecular weight, the customary regulators, for example mercaptans, aldehydes and chlorinated hydrocarbons, can be added in the polymerization.

The polymerization can, regardless of the polymerization process selected, by carried out batchwise or continuously, with or without use of seed latices, with initial charging of all or some constituents of the reaction mixture, or with partial initial charging and further metering in of some or all constituents of the reaction mixture, or by the feed stream addition process without an initial charge. The solids content of the dispersion obtainable in this way is from 20 to 60%. The mean particle size is from 0.1 to 10 μm, preferably from 0.2 to 5 μm.

The drying of the dispersion can be carried out by means of spray drying, freeze drying or fluidized-bed drying. Preference is given to spray drying in customary spray drying units, where atomization can be carried out by means of single-fluid, two-fluid or multifluid nozzles or using a rotary atomizer disk. The outlet temperature is generally selected so as to be in the range from 55° C. to 100° C., preferably from 70° C. to 90° C., depending on the unit, the Tg of the resin and the desired degree of drying.

For spray drying, the dispersion of the polymer a) having a solids content of preferably from 20% to 60% is sprayed together with protective colloids as spraying aid and dried. Protective colloids used here can be the abovementioned water-soluble polymers b) and can be added to the aqueous dispersion before spray drying, in the form of an aqueous solution. In this process step, preference is given to adding from 5 to 20% by weight of water-soluble polymer b), based on polymer a).

The functionalized solids which act as crosslinker can be cosprayed during spray drying; in this case, spraying through separate nozzles is preferred. Another, preferred method of producing the powder composition of the invention is mixing the functionalized solid into the dried dispersion powder at the lower end of the spray dryer or in a separate apparatus.

In a preferred embodiment, the powder composition further comprises catalysts for accelerating the crosslinking reaction. Suitable catalysts are, inter alia, phase transfer catalysts, for example quaternary ammonium salts such as tetrabutylammonium, benzyltrimethylammonium, benzyltriethylammonium, methyltributylammonium and methyltrioctylammonium salts; quaternary phosphonium salts such as tetrabutylphosphonium salts; quaternary pyridinium salts such as N-(2-ethylhexyl)-4-(N',N'-dimethylamino)pyridinium salts. In general, these salts are in the form of halides, for example chloride or bromide, or as sulfate or acetate. Also suitable are crown ethers such as 18-crown-6, dibenzo-18-crown Kryptofix (2.2.2), tris[2-(2-methoxyethoxy)ethyl]amine; polyethers such as polyethylene glycols (PEG 1000, PEG 2000) or tris(dioxa-3,6-heptyl) amine (TDA-1); furthermore polyethylene glycol dialkyl ethers, polyethylene glycol aryl aralkyl ethers such as Triton$^R$CF10, polyethylene glycol alkyl aryl ethers and tertiary diamines or oligoamines suitable for complex formation, e.g. N,N,N',N'-tetramethylethylenediamine. However, other catalysts such as transition metal compounds which are sufficiently stable in the reaction medium, in particular transition metal complexes, acids and bases (for example DABCO) can also be used to accelerate the crosslinking reaction. The catalysts are usually added in an amount of from 0.01 to 5% by weight, based on the polymer components a) and b).

If desired as a mixture with these crosslinkers, other additives may be added to the powder mixture. Examples of additives for modification are antiblocking agents, dyes, pigments, plasticizers, film-formation aids, antifoams, catalysts, rheology improvers, thickeners, coupling agents and emulsifiers; if these are liquid in the original state, they have to be converted into a pulverulent state before being mixed in.

The dispersion powder composition can be used in typical fields of application for such powders, for example in chemical building products in combination with inorganic, hydraulically setting binders such as cements (Portland, alumina, pozzolanic, slag, magnesia or phosphate cement), plaster of Paris, water glass, for the production of building adhesives, plasters and renders, knifing fillers, screeds, jointing mortars and paints. It can also be used as sole binder for coating compositions and adhesives or as binder for textiles and paper. The dispersion powder composition is preferably used as binder in fields of application in which not only good adhesion but also reduced water absorption and/or good solvent resistance are desired.

When using functionalized solids as crosslinkers, high degrees of crosslinking are achieved, the storage stability of the powder mixtures is likewise good and blocking stability is generally ensured with only a small addition, if any, of antiblocking agents. Furthermore, these crosslinkers improve the flowability of the mixtures. It is surprising that the particles which are insoluble in water and in organic solvents lead to a degree of crosslinking comparable to that produced by soluble products, although the polymer to be crosslinked is likewise present in the form of particles and not as liquid and is likewise insoluble in the reaction medium (water).

The following examples illustrate the invention:
Preparation of Functionalized Silica
M001:

100 g of a pyrogenic silica having a specific surface area measured by the BET method of 200 m$^2$/g (Wacker product, tradename HDK N20) and 20 g of water were intensively mixed, a mixture of 20 g of isopropanol and 20 g of 3-triethoxysilylpropylsuccinic anhydride (Wacker product, tradename Silan GF 20) was subsequently added in finely dispersed form and the materials were mixed. After mixing for 15 minutes, the powder was reacted at 150° C. for 2 hours and, during this procedure, freed of excess water and volatile silicon compounds in a gentle stream of nitrogen. A white powder was obtained. Carbon according to elemental analysis: 5.8%.
M002:

100 g of a pyrogenic silica having a specific surface area measured by the BET method of 200 m$^2$/g (Wacker product, tradename HDK N20) and 20 g of water were intensively mixed, a mixture of 20 g of isopropanol and 20 g of glycidoxypropyltriethoxysilane (Wacker product, tradename Silan GF82) was subsequently added in finely dispersed form and the materials were mixed. After mixing for 15 minutes, the powder was reacted at 120° C. for 2 hours and, during this procedure, freed of excess water and volatile silicon compounds in a gentle stream of nitrogen. A white powder was obtained. Carbon according to elemental analysis: 5.0%.
M003:

100 g of a pyrogenic silica having a specific surface area measured by the BET method of 200 m$^2$/g (Wacker product, tradename HDK N20) and 20 g of water were intensively mixed, a mixture of 20 g of isopropanol and 20 g of aminoethylaminopropyltrimethoxysilane (Wacker product, tradename Silan GF91) was subsequently added in finely dispersed form and the materials were mixed. After mixing for 15 minutes, the powder was reacted at 150° C. for 2 hours and, during this procedure, freed of excess water and volatile silicon compounds in a gentle stream of nitrogen. A white powder was obtained. Carbon according to elemental analysis: 5.0%.
M004:

100 g of a pyrogenic silica having a specific surface area measured by the BET method of 200 m$^2$/g (Wacker product, tradename HDK N20) and 20 g of water were intensively mixed, a mixture of 20 g of isopropanol and 2 g of methacryloxypropyltrimethoxysilane (Wacker product, tradename Silan GF31) was subsequently added in finely dispersed form and the materials were mixed. After mixing for 15 minutes, the powder was reacted at 150° C. for 2 hours and, during this procedure, freed of excess water and volatile silicon compounds in a gentle stream of nitrogen. A white powder was obtained. Carbon according to elemental analysis: 0.8%.

EXAMPLE 1

A 16 l stirring autoclave was charged with 3420 g of water, 352 g of polyvinyl alcohol having a Höppler viscosity of 4 mPas (4% strength solution in water at 20° C.) and a saponification number of 140, 50 g of dodecylbenzenesulfonate (15% strength in water), 510 g of vinyl acetate and 200 g of ethylene and the mixture was heated to 50° C. The catalyst solutions, a 6% strength aqueous solution of sodium persulfate and a 3% strength aqueous solution of sodium formaldehydesulfoxylate, were then fed in. After the polymerization had started, the monomer feed stream comprising 2800 g of vinyl acetate and 120 g of glycidyl methacrylate was fed in. During the polymerization, a further 800 g of ethylene were injected. After the metering-in time of about 5 hours, polymerization was continued for another 2 hours.

The solids content of the dispersion was 51%. The polymer had a K value of 74.5, a $T_g$ of 4° C. and an MFT of 0° C.

Before spraying, 8.1% by weight, based on polymer, of polyvinyl alcohol having a Höppler viscosity of 13 mPas (4% strength solution in water at 20° C.) and a saponification number of 140 plus 0.8% by weight, based on polymer, of polyvinyl alcohol having a Höppler viscosity of 5 mPas (4% strength solution in water at 20° C.) and a saponification number of 140 were added in the form of aqueous solutions. The solids content of the mixture to be sprayed was 35%. Drying was carried out in a Nubilosa spray dryer at an outlet temperature of 82° C. and a compressed air pressure upstream of the 2-fluid nozzle of 4 bar.

After spraying, functionalized silica of the type indicated in the Table was mixed into the powder in the amount indicated.

EXAMPLE 2

A 16 l stirring autoclave was charged with 2000 g of water and 487 g of polyvinyl alcohol having a Höppler viscosity of 4 mPas (4% strength solution in water at 20° C.) and a saponification number of 140, the mixture was heated to 50° C. and ethylene was injected to a pressure of 60 bar. This pressure was maintained during the entire time over which the monomers were metered. The catalyst feed streams, a 2.6% strength aqueous solution of t-butyl hydroperoxide and a 4.5% strength aqueous sodium formaldehydesulfoxylate solution, were fed in simultaneously with the monomer feed stream. The monomer solution consisted of 4563 g of vinyl chloride, 1950 g of vinyl acetate and 200 g of glycidyl acrylate. After the reaction had started, a solution of 667 g of polyvinyl alcohol having a Höppler viscosity of 4 mPas (4% strength solution in water at 20° C.) and a saponification number of 140 in 3937 g of water was metered in over a period of from 6 to 7 hours. The period over which the monomer mixture was metered in was 8 h. After the metering-in was complete, polymerization was continued for another 2 hours. The solids content was 50.2%. The $T_g$ of the polymer was 13.5° C.

Before spray drying, 8.1% by weight, based on polymer, of polyvinyl alcohol having a Höppler viscosity of 13 mPas (4% strength solution in water at 20° C.) and a saponification number of 140 plus 0.8% by weight, based on polymer, of polyvinyl alcohol having a Höppler viscosity of 5 mPas (4% strength solution in water at 20° C.) and a saponification number of 140 were added in the form of aqueous solutions. Drying was carried out as in Example 1 in a Nubilosa spray dryer.

After spraying, functionalized silica of the type indicated in the Table was mixed into the powder in the amount indicated.

Testing of the Powder Mixtures
Determination of the degree of crosslinking:

A film sample dried at room temperature was heated at 170° C. in a solvent suitable for the uncrosslinked sample, generally dimethylformamide, for 5 minutes in a microwave oven.

Evaluation was carried out by determining the solids content of the sieved liquid $$\text{Degree of crosslinking } (\%) = \frac{\text{measured solids content}}{\text{theoretical solids content}} - 1 \times 100$$

Determination of the flowability:

To determine the flowability, the powder to be examined was, in accordance with DIN 53916, introduced into a funnel-shaped vessel having a capacity of 50 ml and an outlet nozzle having a diameter of 8 mm and the surface was struck flat with a glass rod. After opening the outlet flap, the time taken for the powder to run out from the funnel was determined. The flowability was assessed qualitatively.

Determination of the blocking resistance:

To determine the blocking resistance, the dispersion powder was introduced into an iron tube provided with a screw cap and was then compressed with a metal punch. After compression, the tube and powder were stored at 50° C. for 16 hours in a drying oven. After cooling to room temperature, the powder was taken from the tube and the blocking resistance was determined qualitatively by crushing the powder.

The blocking resistance was classified as follows:
A=blocking resistant
B=moderately blocking resistant
C=not blocking resistant.

Determination of the redispersibility of the films:

To determine the degree of crosslinking of the films, a drop of water was applied to each of the films produced using the redispersion and the redispersibility of the films was determined after 60 seconds by rubbing with the fingertip.

Evaluation of the Film Redispersibility

Grade 1: very readily redispersible
Film can be redispersed immediately by very light rubbing or redisperses spontaneously.

Grade 2: readily redispersible
Film can be readily dispersed by rubbing; pieces of film are possible, but are few and very easily redispersible between the fingers.

Grade 3: somewhat redispersible
Film can be redispersed only by vigorous rubbing; substrate is reached only slowly with destruction of film (pieces of film); pieces of film not redispersible.

Grade 4: not redispersible
Film cannot be redispersed even by prolonged vigorous rubbing; film breaks up into pieces of film without redispersing or becomes detached from the substrate.

The results of testing are summarized in the Table below:

Comparison of Comparative Example 1 with Example 2 shows that the compositions of the invention give powders whose blocking resistance and flowability is improved despite the content of crosslinker. The high sedimentation after 24 hours in Example 2 indicates crosslinking of the protective colloids.

Comparison of Example 2 with Example 3 shows that the degree of crosslinking increases with addition of catalyst, with the improvement in the sedimentation after 24 hours showing that the protective colloid does not become crosslinked.

Example 4 and Comparative Example 3 clearly show that, compared to compositions comprising conventional crosslinkers, the compositions of the invention give powders having a higher blocking resistance and flowability. Although the functionalized solid particles are not soluble, the degree of crosslinking is not reduced when crosslinking occurs in aqueous medium.

The improvement in sedimentation and degree of crosslinking when using catalyst is confirmed by comparison of Example 4 with Example 6.

TABLE 1

| Experiment No. | Comp. 1 | 1 | 2 | Comp. 2 | 3 | 4 | Comp. 3 | 5 | 46 |
|---|---|---|---|---|---|---|---|---|---|
| Example No. | 1 | 1 | 1 | 2 | 2 | 2 | 2 | 1 | 2 |
| Additive type | — | M001 | M003 | — | M001 | M003 | HMM | M003 + DABCO | M003 + DABCO |
| % | — | 5 | 2.5 | — | 3 | 3 | 0.5 | 2.5 + 1 | 5 + 1 |
| Blocking resistance | B | A | A | A–B | A | A | B | A | A |
| Flowability | good | very good | very good | good | very good | very good | still good | very good | very good |
| Sedimentation 1 h | — | >7 | 0.2 | 0.2 | 0.2 | 0.3 | 0.2 | 0.1 | 0.2 |
| Sedimentation 24 h | 1.4 | >7 | 3.4 | 1.8 | 1.7 | 2.1 | 2.2 | 0.4 | 0.7 |
| Redispersibility (film, 1 h, 90° C.) | 2 | 3 | 3 | 1 | 2–3 | 2 | 2–3 | 3–4 | 4 |
| Degree of crosslinking (%) | 29.9 | 54.4 | 46.2 | 12.5 | 41.4 | 39.5 | 45.6 | 67.7 | 80.6 |

HMM = hexamethylenediamine;
DABCO = triethylendiamine

What is claimed is:

1. A crosslinkable powder composition which is redispersible in water and comprises
   a) from 30 to 95 parts by weight of at least one water-insoluble, film-forming crosslinkable polymers of at least one free-radically polymerizable, ethylenically unsaturated monomer, selected from the group consisting of vinyl esters of unbranched or branched alkylcarboxylic acids having from 1 to 15 carbon atoms, methacrylic and acrylic esters of unbranched or branched alcohols having from 1 to 12 carbon atoms, fumaric and maleic monoesters or diesters of unbranched or branched alcohols having from 1 to 12 carbon atoms, dienes, olefins, vinylaromatics and vinyl halides,
   b) from 5 to 70 parts by weight of at least one water-soluble polymer selected from the group consisting of polyvinyl alcohols, polyvinyl alcohols containing carboxyl groups, acetoacetyl groups or amine groups, starches, carboxymethyl-substituted starches, celluloses, casein, melamine-formaldehyde sulfonates, naphthalene-formaldehyde and sulfonates
   where at least one of the polymer components a) and b) comprises at least one comonomer unit containing crosslinkable groups, and the parts by weight of a) and b) add up to 100 parts by weight, and
   c) from 0.5 to 30% by weight, based on the total weight of a) and b), of at least one inorganic or organic solid crosslinking agent selected from the group consisting of functionalized, finely divided oxides of boron, aluminum, iron, cobalt, chromium, manganese, silicon, germanium, tin, titanium and zirconium, their mixed oxides, functionalized unhydrolyzed starch and cellulose powders, organic pigments, carbon black, silicone resins and pulverulent, highly crosslinked polymers, said crosslinking agents being insoluble in water and in organic solvents and have a mean particle size of from 5 nm to 100 $\mu$m, said solids having, chemically bound to their surface, functional groups capable of forming covalent bonds with the crosslinkable groups of the polymers a) and b).

2. A crosslinkable powder composition which is redispersible in water as claimed in claim 1 wherein polymer a) comprises one or more crosslinkable monomer units selected from the group consisting of monomers containing alkoxysilane, epoxide, isocyanate, amido, hydroxy, carboxyl, sulfonic acid, carbonyl, amino or hydrazide groups.

3. A crosslinkable powder composition which is redispersible in water as claimed in claim 1, comprising as polymer b) water-soluble protective colloids which optionally may be functionalized by hydroxyl groups, mercapto groups, carboxyl groups, amine groups or carbonyl groups.

4. A crosslinkable powder composition which is redispersible in water as claimed in claim 1 comprising functionalized silicon dioxides such as silica gels or silicas.

5. A crosslinkable powder composition which is redispersible in water as claimed in claim 1, wherein the functional groups which are chemically bound to the surface of the solid particles are at least one member selected from the group consisting of halogen, hydroxy, thiol, amino, epoxy, carboxyl, carboxylic anhydride, carbonyl, hydrazide and aziridine groups, reactive methylene groups, groups containing polymerizable carbon double bonds, free-radical-forming groups, and isocyanate groups which optionally may, be blocked.

6. A crosslinkable powder composition which is redispersible in water as claimed in claim 5, wherein the functionalized solids are obtainable by reacting the solids with monomeric, oligomeric or polymeric organosilicon compounds comprising units of the structure $R_a R^1 SiX_b$, in which a=0, 1 or 2, b=1, 2 or 3 and a+b=3, where R are identical or different and are each a saturated or unsaturated, aliphatic or aromatic hydrocarbon radical having from 1 to 18 carbon atoms, X is a reactive radical selected from the group consisting of halogen, —$NH_2$, —OH and alkoxy, and $R^1$ is a functional alkyl or aryl radical.

7. A crosslinkable powder composition which is redispersible in water as claimed of claim 1, comprising a catalyst selected from the group consisting of quaternary ammonium salts, quaternary phosphonium salts, quaternary pyridinium salts, crown ethers, polyethers, polyethylene glycol dialkyl ethers, polyethylene glycol aryl aralkyl ethers, polyethylene glycol alkyl aryl ethers, tertiary diamines or oligoamines suitable for complex formation, transition metal compounds, acids and bases.

8. The crosslinkable powder composition of claim 5 wherein the free-radical-forming groups are hydroperoxide groups or isocyanate groups which optionally can be blocked.

9. Binder composition for textiles and paper containing the crosslinkable powder compositions of claim 1.

10. Coating composition containing the crosslinkable powder composition of claim 1.

11. Adhesive compositions containing the crosslinkable powder composition of claim 1.

* * * * *

UNITED STATES PATENT AND TRADEMARK OFFICE
CERTIFICATE OF CORRECTION

PATENT NO. : 6,197,863 B1  
DATED : March 6, 2001  
INVENTOR(S) : Herbert Eck et al.

It is certified that error appears in the above-identified patent and that said Letters Patent is hereby corrected as shown below:

<u>Title page,</u>
Item [63], Related U.S. Application Data, should read,

-- Continuation of application No. 09/126,455, filed on July 29, 1998, now abandoned. --

Signed and Sealed this

Eighth Day of January, 2002

*Attest:*

JAMES E. ROGAN
*Attesting Officer*   *Director of the United States Patent and Trademark Office*